Nov. 5, 1963 M. C. JAHN ETAL 3,109,390
MACHINE FOR FORMING SHELLS OF PIE CRUST DOUGH
Filed Feb. 10, 1961 7 Sheets-Sheet 1

INVENTORS.
MARION C. JAHN
THOMAS P. McNICHOLS
BY
ATT'YS

Nov. 5, 1963  M. C. JAHN ETAL  3,109,390
MACHINE FOR FORMING SHELLS OF PIE CRUST DOUGH
Filed Feb. 10, 1961  7 Sheets-Sheet 2

INVENTORS:
MARION C. JAHN
THOMAS P. McNICHOLS
BY
ATT'YS

Nov. 5, 1963   M. C. JAHN ETAL   3,109,390
MACHINE FOR FORMING SHELLS OF PIE CRUST DOUGH
Filed Feb. 10, 1961   7 Sheets-Sheet 3

FIG. 6

INVENTORS:
MARION C. JAHN
THOMAS P. McNICHOLS
BY
ATT'YS

Nov. 5, 1963   M. C. JAHN ETAL   3,109,390
MACHINE FOR FORMING SHELLS OF PIE CRUST DOUGH
Filed Feb. 10, 1961   7 Sheets-Sheet 4

INVENTORS:
MARION C. JAHN
THOMAS P. McNICHOLS
BY
ATT'YS

Nov. 5, 1963    M. C. JAHN ETAL    3,109,390
MACHINE FOR FORMING SHELLS OF PIE CRUST DOUGH
Filed Feb. 10, 1961    7 Sheets-Sheet 5

INVENTORS:
MARION C. JAHN
THOMAS P. McNICHOLS
BY
ATT'YS

INVENTORS:
MARION C. JAHN
THOMAS P. McNICHOLS
ATT'YS

United States Patent Office 3,109,390
Patented Nov. 5, 1963

3,109,390
MACHINE FOR FORMING SHELLS OF
PIE CRUST DOUGH
Marion C. Jahn, Chicago, Thomas P. McNichols, Harvey, Ill., assignors to Colborne Manufacturing Company, Chicago, Ill., a corporation of Illinois
Filed Feb. 10, 1961, Ser. No. 88,490
9 Claims. (Cl. 107—15)

This invention relates to a mechanism for forming shells of pie crust dough. More in particular this invention relates to a mechanism for automatically forming a pie shell from a quantity of pie crust dough deposited on a pie plate moving on a conveyor.

In large bakeries where open faced pies are made at high production rate, the rolled crust dough is usually deposited as a sheet on a pie plate carried on a conveyor. When the plate with the dough sheet reaches the forming station an operator manually removes the plate and dough sheet from the conveyor and positions them on a conventional forming machine which forms the shell and rim of the pie and trims away any excess dough therefrom. Thereafter the plate with the formed dough shell therein is manually removed from the former and placed upon a conveyor which carries it to the filling station. From the filling station the unbaked pies are carried to such other processing operations that may be required.

The present invention not only eliminates the necessity of providing an operator for the forming operation on the pie shell but also increases production rate by accomplishing the shell forming operation on one or a plurality of pie plates automatically as the pie plates are carried on the conveyor. Therefore a prime object of the invention is a machine in co-operative relation with a conveyor for forming shells from pie crust dough automatically.

Another important object of the invention is a machine in co-operative relation with a conveyor whereby a plurality of pie shells may be formed and trimmed simultaneously.

A further important object of the invention is a machine in accordance with the preceding objects whereby pie shells of the standing rim type for open faced pies are formed and trimmed.

A still further object of the invention is a machine for automatically forming a plurality of pie shells simultaneously in pie plates carried on a continuous motion conveyor.

Another object of the invention is to increase the production rate of forming pie shells and reducing the production costs thereof.

These and other desirable objects encompassed by the invention will become more apparent from the ensuing description of a specific embodiment of this invention, the appended claims and the annexed drawings wherein:

Figures 1, 2:
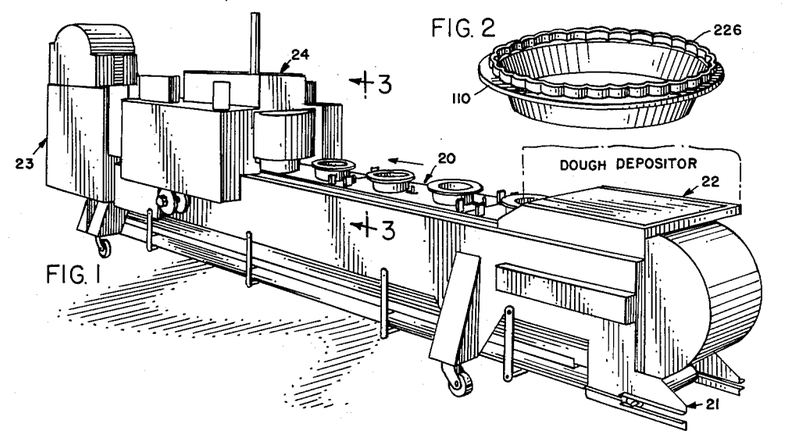
FIGURE 1 is a perspective view of a conveyor having, on the rightward end thereof, a conventional dough sheet depositing device; a conventional pie filling device on the leftward end thereof; and a pie shell forming machine according to this invention disposed therebetween.
FIGURE 2 is a perspective view of an example of a formed open faced pie shell of the standing rim type made with the machine of this invention.

Referring now to FIGURE 1 there is shown a conveyor 20 of conventional construction mounted on a suitable base indicated at 21. Mounted on the rightward end of the conveyor 20 is a conventional pie crust dough sheet depositor 22 and a conventional pie filling unit 23 mounted near the terminal end of the conveyor 20. Mounted on the base 21 between the depositor 22 and the filling unit 23 is the pie crust forming, trimming and serrating mechanism 24 comprising the present invention.

Figure 3:
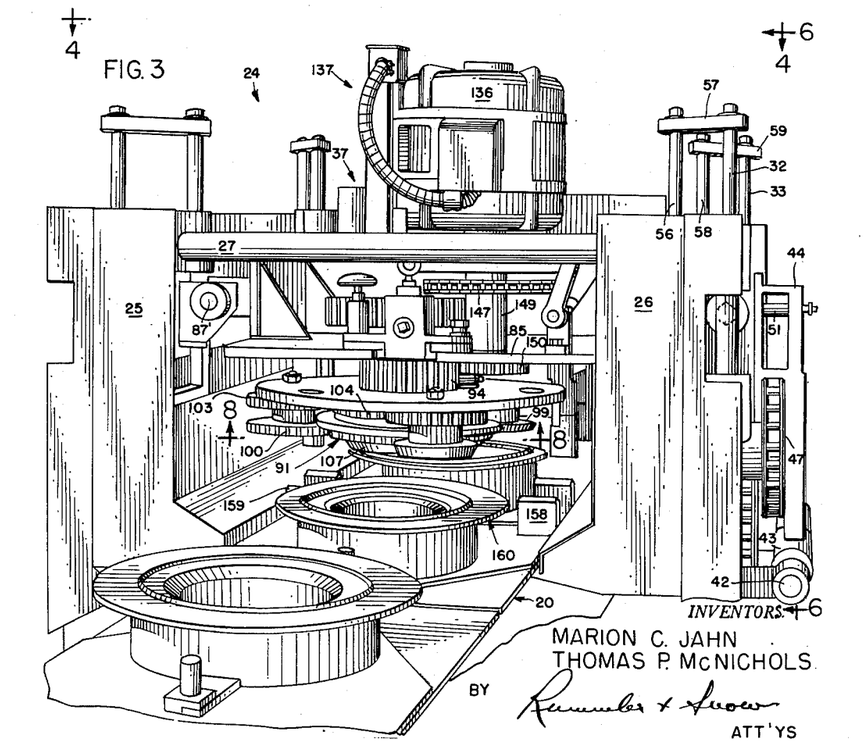
FIGURE 3 is an enlarged perspective view taken along the line 3—3 of FIGURE 1 illustrating a general view of the assembly of the shell forming machine of this invention.

Referring now to FIGURE 3 the mechanism 24 comprises a pair of transversely spaced longitudinally extending frame members 25 and 26 rigidly secured to the base 21. The upper portions of the frame members 25 and 26 may conveniently be, if desired, connected together by a pair of rods or cross-members one of which is shown at 27, thus forming a rigid frame. Since the mechanism 24 is symmetrically constructed the side supported by frame member 26 will only be described, it being assumed that the other side supported by frame member 25 is symmetrical thereto.

Figure 6:
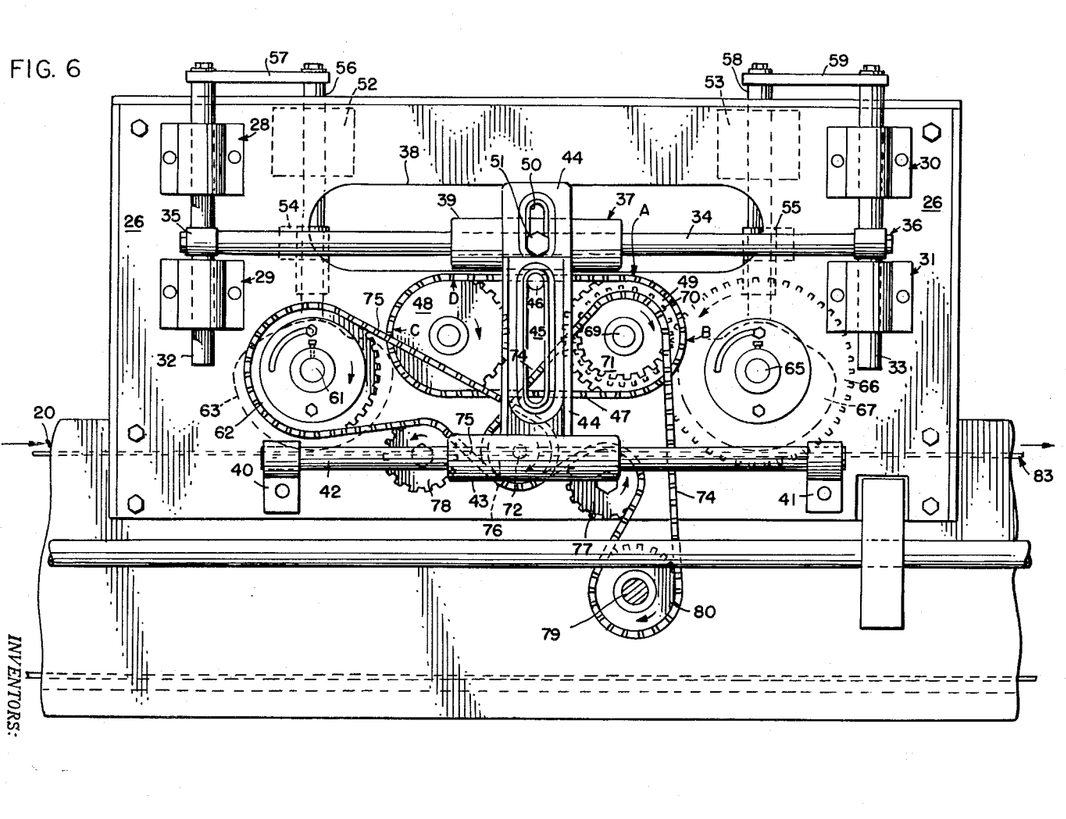
FIGURE 6 is a side elevation, partly broken away, taken on line 6—6 of FIGURE 3 illustrating construction details of a portion of the forming head carrier and means for moving it in co-operative relation with the conveyor.

Referring now to FIGURE 6 it will be seen that the frame member 26 is provided with a first pair of vertically spaced and alined bearings 28 and 29 mounted adjacent the forward end thereof. A second pair of vertically spaced alined bearings 30 and 31 are similarly disposed on the rearward end portion of the frame member 26 as shown. A first shaft 32 is slidably disposed in the bearings 28 and 29 and a second shaft 33 is slidably disposed in the bearings 30 and 31. A longitudinally extending rod 34 having its ends rigidly secured to the shafts 32 and 33 by conventional connecting elements 35 and 36 is provided for supporting a carrier indicated by the numeral 37 partly shown in FIGURE 6. The carrier 37 is supported on one side by the rod 34 and is slidable thereon in a longitudinal direction. The carrier 37 extends between the frame members 25 and 26 (FIGURE 3) and for this reason an elongated opening 38 is provided in the frame member 26 to accommodate the carrier bearing 39 slidably mounted on the rod 34 as shown best in FIGURE 6. From this it can be seen that the carrier bearing 39 moves longitudinally on the rod 34 and that the rod 34 may move vertically a limited distance by means of shafts 32 and 33 sliding in bearings 28–31.

Mounted on the lower portion of the frame member 26 as shown in FIGURE 6 is a pair of support elements 40 and 41 supporting rigidly the rod 42. Slidably supported on the rod 42 is a bearing 43 having a vertically extending arm 44. The arm 44 is provided with a vertically disposed elongated slot 45. Disposed within the slot 45 is a protruding lug 46 carried by and secured to one link of the sprocket chain 47. Mounted on and journalled for rotation on the frame member 26 is a pair of sprocket wheels 48 and 49 supporting in meshed relation the sprocket chain 47 as shown. Now as the chain 47 is moved by rotation of the sprocket wheels 48 and 49 the lug 46 engaging the arm 44 through slot 45 moves the bearing 43 longitudinally in an oscillating or reciprocating motion. On the upper portion of the arm 44 is another elongated slot 50 which may be in vertical alinement with the slot 45. A transversely extending lug 51 protruding from the carrier bearing 39 is in engaging relation with the slot 50. Thus the oscillating motion of the bearing 43 is imparted to the carrier 37 through the carrier bearing 39, lug 51 and slot 50 of arm 44. The purpose of elongated slot 50 is to permit the carrier 37 to move vertically as well as horizontally.

In FIGURE 6 on the inner side of the frame member 26 is mounted a pair of bearings 52 and 53 shown in dotted lines. A bearing 54 shown in dotted lines is mounted on the inner side on the frame member 26 in vertical alinement with the bearing 52. Likewise bearing 55 shown in dotted lines is also mounted on the inner side of the frame member 26 in vertical alinement with the bearing 53. Slidably disposed in the bearings 52 and 54 is a first cam follower shaft 56 the upper end thereof being rigidly connected to the shaft 32 by a cross-arm 57. In a similar manner the bearings 53 and 55 support a second cam follower shaft 58 having its upper end rigidly connected to the shaft 33 by cross-arm 59. Thus vertical movement of the cam follower shafts 56 and 58 moves the carrier bearing 39 and carrier 37 in a vertical direction.

Mounted on and extending transversely through the frame member 26 is a bearing (not shown) supporting a rotatable shaft 61 as shown in FIGURE 6. Mounted on the outer end of shaft 61 and constrained for rotation therewith is a sprocket wheel 62. As shown, the sprocket 62 is drivingly connected, for relative angular adjustment, with a disk keyed on the shaft 61, the connection being by way of a bolt extending through an angularly extending slot in the disk and into the body of the sprocket. Secured to the shaft 61 on the inner side of the frame member 26 is a cam 63 positioned in engaging relation with the lower end of cam follower shaft 56. In a similar manner another bearing (not shown) is mounted on and extends transversely through the frame member 26. This bearing supports a rotatable shaft 65 extending therethrough, the outer end thereof being secured to a gear wheel 66 which in turn is drivingly connected, for relative angular adjustment, with a disk keyed on the shaft 65, the connection being in the same manner as described for the sprocket 62. Secured to the inner end of the shaft 65 is a second cam 67. The curvature of the periphery of the cam 67 is symmetrical with respect to the curvature of the aforementioned cam 63. The peripheral portion of the cam 67 is positioned for engagement with the lower end of the cam follower shaft 58 as illustrated in FIGURE 6.

From the above and as shown in FIGURE 6 it can be readily appreciated that when the cam 63 is rotated in one direction at the same speed as the rotation of cam 67 in the opposite direction, parallel vertical motion is imparted to the cam follower shafts 56 and 58. Parallel motion in vertical direction of the cam follower shafts 56 and 58 imparts similar motion to shafts 32 and 33 through the cross-arms 57 and 59, respectively. This in turn imparts vertical motion to the rod 34, carrier bearing 39 and carrier 37, which vertical motion is permitted by the elongated slot 50 in the arm 44. Means will now be described for driving the sprocket 62 and gear wheel 66, as well as sprocket wheels 48 and 49.

Secured to the frame member 26 is a bearing (not shown) supporting a rotatable shaft 69. Secured to the shaft 69 is a pinion 70 in meshed relation with the gear wheel 66. Also secured to the shaft 69 is the above described sprocket wheel 49. In addition another sprocket wheel 71 is secured to the shaft 69 in drive relation.

In FIGURE 6 shown in dotted lines is shaft 72 mounted on the outer side of the frame member 26 and journalled for rotation. Secured to the shaft 72 are a pair of sprocket wheels one of which is shown in dotted lines in FIGURE 6 at 76 and the other at 73 in FIGURE 13. The sprocket wheel 76 is in meshed relation with the sprocket chain 75 and the other sprocket wheel 73 on shaft 72 is in meshed relation with sprocket chain 74. Idler sprocket wheels 77 and 78 mounted on the outer side of the frame member 26 and journalled for rotation are positioned in meshed relation with sprocket chains 74 and 75, respectively, to remove or eliminate slack.

Figure 13:
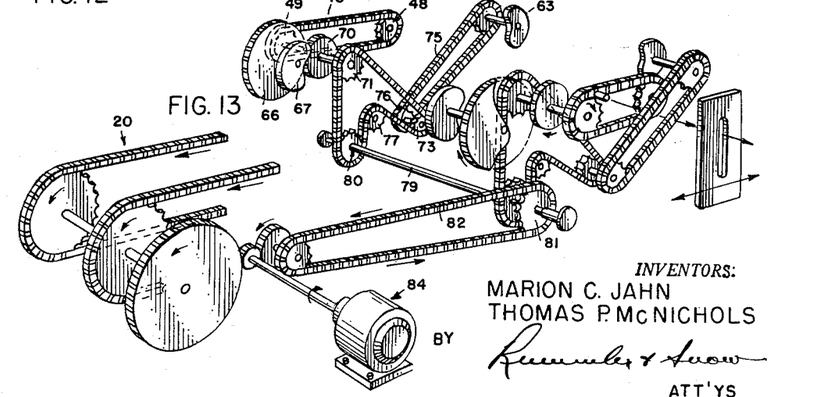
FIGURE 13 is a diagrammatic view showing, as a power diagram, the means for synchronizing the motion of the forming head carrier with that of the conveyor wherein the carrier is propelled by the same source of power that propels the conveyor.

A transverse drive shaft 79, extending through both frame members 25 and 26, serves to drive the above described mechanism for moving the carrier 37 as well as the identical carrier mechanism mounted on the frame-member 25, the power train being best observed in FIGURE 13. Adjacent the frame member 26 and secured to the drive shaft 79 is a drive sprocket wheel 80. As viewed in FIGURE 13 a sprocket wheel 81 secured to the shaft 79 is driven by sprocket chain 82 which chain is driven by the same power source, indicated generally at 84 in FIGURE 13, for driving the conveyor 20.

At this point it should be mentioned that with the exception of idler sprocket wheels 77 and 78 all of the sprocket wheels shown in FIGURES 6 and 13 as well as the gear wheel 66 and pinion 70 must be carefully selected for diametrical dimensions. First the linear speed of the lug 46 on sprocket chain 47 must be exactly the same as the linear speed of the conveyor 20. Second, the rotational speed of the cam 63 must be exactly the same as the rotational speed of the cam 67. Third the lug 46 on the sprocket chain 47 must move through one complete orbital or peripheral cycle for each revolution of the cams 63 and 67. Having this in mind a complete cycle of movement of the carrier 37 will now be described.

Referring to FIGURE 6 it will be seen that the carrier 37 is in its downward position (pie engaging position). Thus the cam followers 56 and 58 are traversing the receded surfaces of the cams 63 and 67, respectively, and the lug 51 with respect to the slot 50 is in the position shown. The lug 46 in slot 45 is moving in a rightward direction at the same speed as the conveyor 20. Shortly prior to the time when the lug 46 reaches point A (where the lug 46 engages sprocket wheel 49) the cams 63 and 67 begin to elevate the cam follower shafts 56 and 58 which in turn begins to elevate the carrier 37. Later it will be seen that the pie crust forming elements mounted on the carrier 37 disengage from the pie crusts and complete disengagement must occur before the lug 46 reaches point A for subsequently the longitudinal speed in the rightward direction of the carrier 37 will decrease until it stops when the lug 46 reaches point B on sprocket wheel 49. When the lug 46 reaches point B the cam follower shafts 56 and 58 will be traversing the outer lobes of cams 63 and 67, respectively, and the carrier 37 will be in its elevated position. The lug 46 now moves from point B on sprocket wheel 49 to point C on sprocket wheel 48 whereby the carrier 37 in its elevated position moves leftwardly (opposite conveyor 20 movement) or return stroke. As the lug 46 moves from point C to point D on sprocket wheel 48 the cams 63 and 67 permit the cam follower shafts 56 and 58, respectively, to lower the carrier 37. However the cams 63 and 67 do not complete the lowering movement of the carrier 37 until the lug 46 has passed point D on sprocket wheel 48 and commences its rightward travel toward point A on sprocket wheel 49 (pie engaging position). This is necessary because until the lug 46 reaches point D the carrier will not be moving rightwardly at the same speed as the conveyor 20 and it is essential that during the pie engaging movement the carrier must move at the same longitudinal speed as the conveyor 20.

From the above it can be seen that the path of movement of the carrier 37 is defined by the cams 63 and 67 and the distance between the rotational centers as well the diameters of the sprocket wheels 48 and 49. The carrier 37 will now be described.

Figure 4:
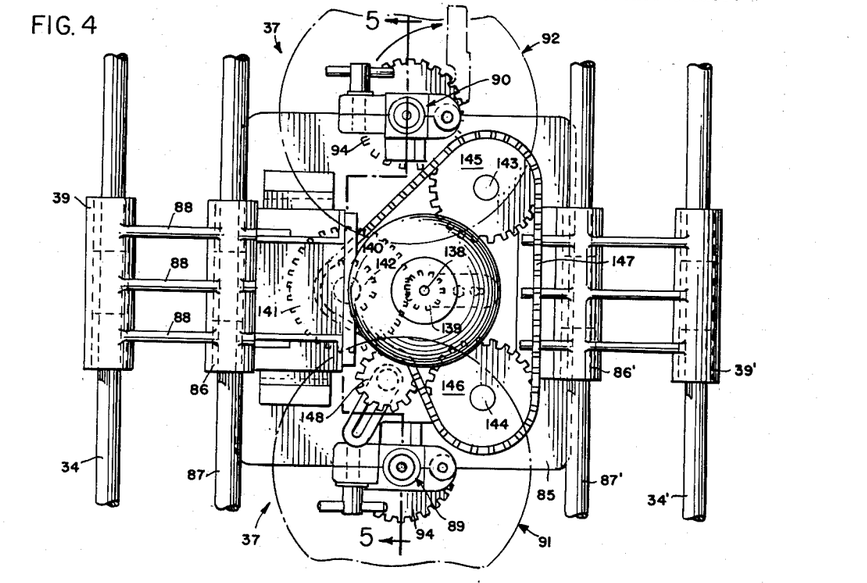
FIGURE 4 is a plan view partly broken away taken in the direction of line 4—4 of FIGURE 3 illustrating the drive means for rotating the trimming and crimping heads employed in the apparatus shown.

Referring now to FIGURE 4 the carrier 37 comprises a horizontal base plate 85. Carrier bearings 86 and 86' are rigidly mounted on the base plate 85 in support relation as shown. The carrier bearing 86 is slidable on the rod 87. One end of the rod 87 is rigidly connected (not shown) to the cam follower shaft 56 (FIGURE 6) and the other end is rigidly connected (not shown) to the follower shaft 58 in a manner similar to that described for supporting rod 34 by the shafts 32 and 33. The carrier bearings 39 and 86 are rigidly connected together by crossbeams three of which are shown at 88 in FIGURE 4. The base plate 85 of the carrier 37 is supported on the opposite side by bearings 86' and 39' slidable on rods 87' and 34', respectively, in the same manner as above described. Carrier bearings 39' end 86' are also connected by cross beams similar to cross beams 88. As previously mentioned the purpose of the elongated opening 38 in frame member 26 (FIGURE 6) is to accommodate the vertical and longitudinal movement of the crossbeams 88 of the carrier 37 (FIGURE 4).

Figure 5:
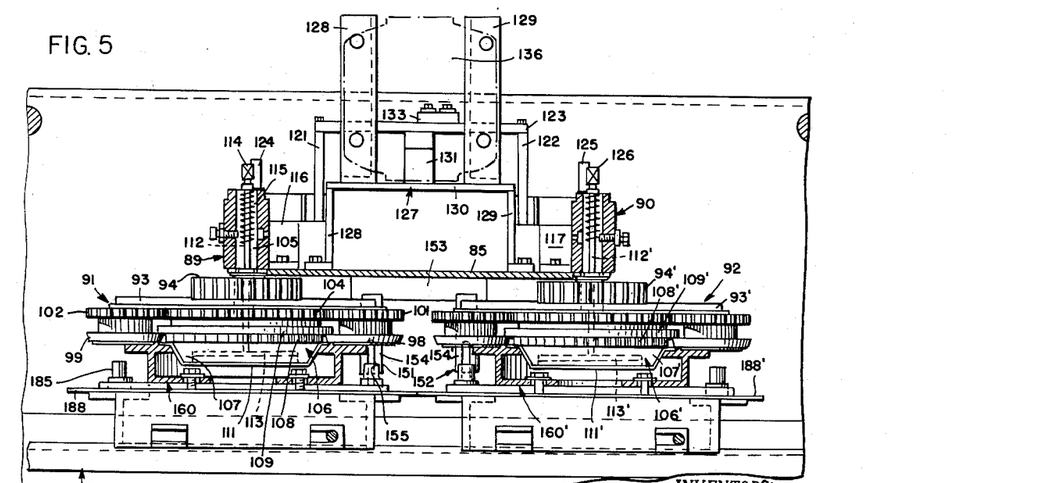
FIGURE 5 is a side elevation, partly in section and broken away, taken on line 5—5 of FIGURE 4 showing the two forming heads in co-operative relation with a pair of pie plate holders supported by a constant motion conveyor.

Referring now to FIGURE 5 there is shown a pair of support members 89 and 90 disposed vertically in longitudinally spaced relation coincidental with the longitudinal centerline of the base plate 85 as evident from FIGURE 4. Each of the support members 89 and 90 support, respectively, forming heads indicated generally at 91 and 92. The forming heads 91 and 92 are constructed identically to each other and therefore only the forming head 91 will be described. Except as otherwise noted the forming head 92 will bear similar numerals but primed for corresponding elements. It may be stated here that the forming head 91 is constructed similar to other known forming heads with the exception that according to the present invention the head 91 is provided with means for forming serrated standing rim pie crusts as will be evident later herein.

Referring to FIGURE 5 the head 91 comprises a circular plate 93 secured to a gear wheel 94. The circular plate 93 and its associated gear 94 are supported by the support member 89 in journalled relation. Thus the plate 93 and gear 94 are rotatable on their common vertical axis.

Figure 7:
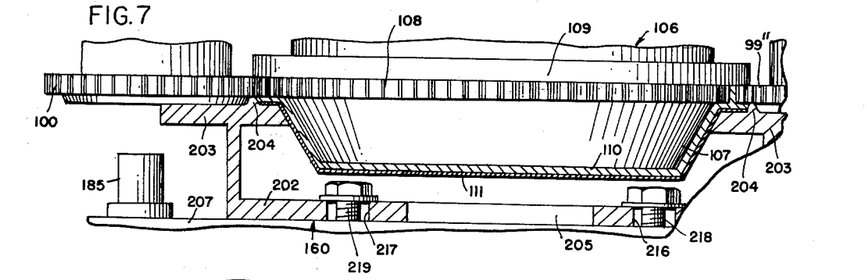
FIGURE 7 is an enlarged side elevation, partly in section and broken away, illustrating a detail of FIGURE 5 of a pie plate holder with a dough sheet in co-operative relation with the forming head.
Figures 8, 9, 10, 11, 12:
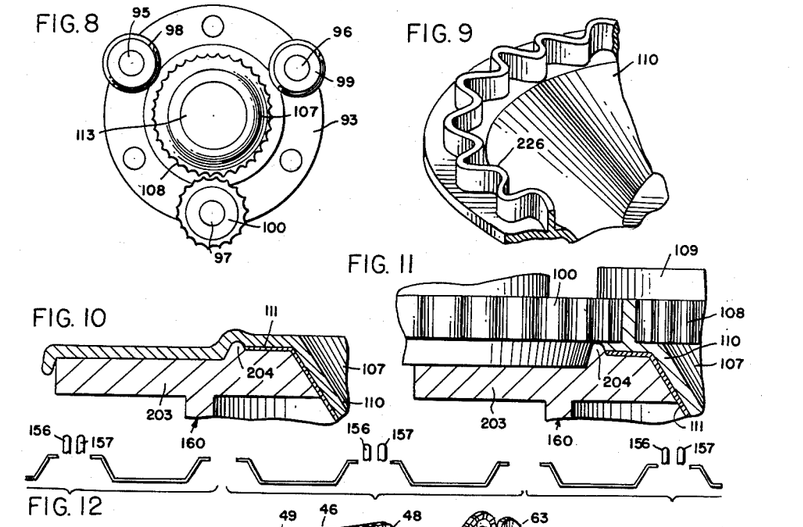
FIGURE 8 is a bottom view taken along the line 8—8 of FIGURE 3 showing the underside of the forming head and associated trimming and crimping elements.
FIGURE 9 is an enlarged perspective view of FIGURE 2, partly broken away, showing the formed pie crust dough after passing through the machine of this invention.
FIGURE 10 is an enlarged view, partly in section and broken away, of a detail of FIGURE 7 illustrating the position of the dough prior to the time of engagement with the forming elements.
FIGURE 11 is similar to FIGURE 10 except showing the serrating elements for forming the dough into a serrated standing rim type of pie shell.
FIGURE 12 is a diagrammatic view of the pie plate holders on the conveyor illustrating the arrangement for engagement of a pair of pie plates with the forming machine of this invention.

Referring now to FIGURES 5 and 8 three vertically disposed shafts 95, 96 and 97 are journalled for rotation on the plate 93 near the periphery thereof spaced 120° apart as best shown in FIGURE 8. As shown in FIGURE 8 two dough cutting wheels 98 and 99 are mounted on shafts 95 and 96 respectively while a dough serrating wheel 100 is mounted on the shaft 97. If desired one of the wheels 98 or 99 may also be a dough serrating wheel as shown at 99'' in FIG. 7.

Now in FIGURE 5 it will be seen that secured to the cutting wheel 98 is a pinion 101 and the cutting wheel 99 is secured to a pinion 102. The dough serrating wheel 100 is similarly secured to a pinion 103 (FIGURE 3). The pinions 101, 102 and 103 are in meshed relation with a stationary gear wheel 104. Thus when the circular plate 93 is rotated the shafts 95, 96 and 97 rotate about the axis of the plate 93 and, in addition, the dough cutting wheels 98 and 99 as well as the dough serrating wheel 100 also rotate about their respective axes as a planetary system. If desirable the shafts 95, 96 and 97 may be mounted on the circular plate 93 in rigid relation and the wheels 98, 99 and 100 with their associated pinions may be journalled for rotation in respect of the shafts.

The supporting member 89 supports a hollow or tubular non-rotative shaft 105 which extends downwardly through the journal of gear 94 and circular plate 93 and the lower end thereof is rigidly connected to the large gear wheel 104 thus holding the gear 104 non-rotatively. Mounted in rigid relation to the underside of the stationary gear 104 is an internal pie crust forming member generally indicated at 106.

Referring now to FIGURE 7 the forming member 106 comprises a stationary frusto-conical section 107 which is contoured to form the inside surface of the bowl of the pie dough. Immediately above the frusto-conical section 107 is a non-rotative serrating element 108 which co-operates with the dough serrating wheel 100 in a similar manner as that for meshed gears except that the peripheral serrations of the wheel 100 do not contact the peripheral serrations of the element 108 as best shown in FIGURE 8.

Disposed above in contiguous relation with the stationary serrating element 108 is a shearing disk 109 as best illustrated in FIGURE 7. The diameter of the shearing disk 109 is greater than the diameter of the non-rotative serrating element 108 so that it overlaps the peripheral portion of the upper surfaces of the wheels 98, 99 and 100. This arrangement presents movable shearing surfaces for cutting away excess pie crust dough as the wheels 98, 99 and 100 rotate about the disk 109 in a planetary system.

Now at this point it can be appreciated that when the carrier 37 is in its lowered position (pie engaging position) and has travelled with the conveyor 20 longitudinally to the point where it begins to rise (approaching point A of FIGURE 6) the cutting and serrating of the dough will have been completed and the heads 91 and 92 must separate or withdraw from the formed pie crust dough. In general this is not a serious problem as the formed pie crust dough 110 normally remains with the pie plate 111 (FIGURE 7) without difficulty. However occasionally a portion of the pie crust dough 110 tends to adhere to the head sufficiently to rupture it. Means will now be described for holding the formed pie crust dough 110 to the pie plate 111 when the heads 91 and 92 are withdrawn by the elevation of the carrier 37.

Referring to FIGURE 5 it will be seen that within the stationary tubular shaft 105 in the support member 89 is a vertically extending slidable rod 112. Rigidly connected to the lower end of the rod 112 is a hold-down plate 113 shown in FIGURE 8 and in dotted lines in FIGURE 5. The frusto-conical section 107 is provided with an axial opening on the underside thereof to accommodate the hold-down plate 113 in vertical slidable relation. During the pie dough forming operation of the head 91 the underside of the hold-down plate 113 is maintained in flush relation with the underside of the frusto-conical section 107.

The upper end of the rod 112 protrudes above the support member 89 in engaging relation with a roller 114. A compression spring 115 is disposed in the non-rotative tubular shaft 105 positioned to urge the rod 112 and its associated holding plate 113 in the upward direction toward the position illustrated in FIGURE 5. The means for operating the roller 114 will now be described.

Figure 17:
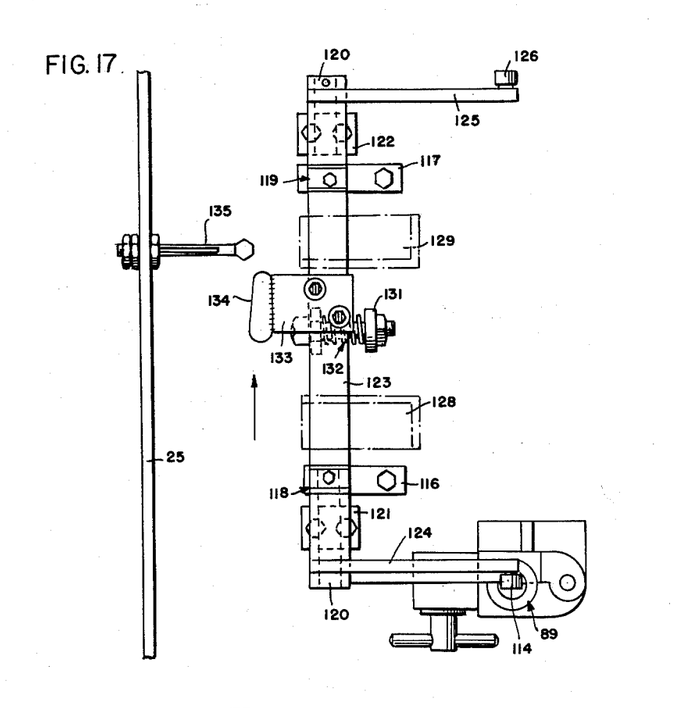
FIGURE 17 is a plan view of a cam operated rock arm assembly which actuates the dough knock-out elements to facilitate removal of the forming heads after the shell forming operation is completed.
Figure 18:
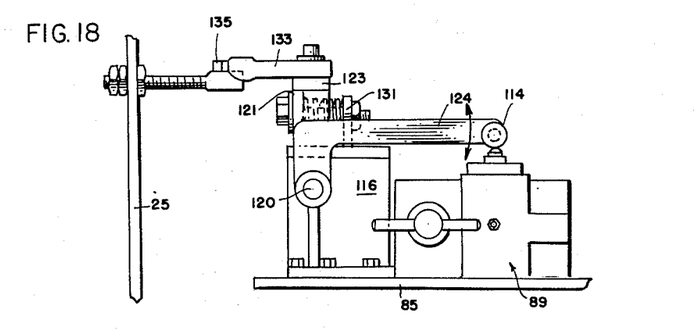
FIGURE 18 is an end view of the rock arm assembly of FIGURE 17 illustrating further construction details thereof.

In FIGURES 17 and 18 it will be seen that a pair of transversely spaced brackets 116 and 117 are mounted on the base plate 85 of the carrier 37. The upper end portions of the brackets 116 and 117 are provided with bearings 118 and 119 supporting in rotatable relation a longitudinally disposed rock shaft 120. Secured to the rock shaft 120 in an upward direction are a pair of rock arms 121 and 122 having a longitudinally extending beam 123 secured to the ends thereof as shown in FIGURES 5 and 18. Secured to the respective ends of the rock shaft 120 are a pair of transversely extending second rock arms 124 and 125. The outer ends of the rock arms 124 and 125 are provided with rollers 114 and 126. From FIGURE 5 it will be seen that the roller 114 engages the upper end of the 112 in support member 89. The roller 126 similarly engages the rod 112' of the support member 90. Thus as viewed in FIGURE 18 a clockwise movement of the beam 123 also moves the second rock arms 124 and 125 clockwise which movement depresses the rods 112 and 112' with their respective hold-down plates 113 and 113'.

A motor support indicated in FIGURE 5 at 127 is supported rigidly on the base plate 85 as shown. The support 127 comprises a pair of upright brackets 128 and 129 rigidly mounted on the base plate 85 of the carrier 37. The upper ends of the brackets 128 and 129 are secured to a cross-plate 130 as shown in FIGURE 5. Extending upwardly from the cross-plate 130 is another bracket 131 to which is anchored one end of an adjustable resilient means 132 comprising a compression spring bearing between the bracket 131 and a lug integral on the cross beam 123 so as to normally urge the rock shaft 120 in the counterclockwise direction as best illustrated in FIGURE 18. The other end of the resilient means 132 is operatively connected to the beam 123. Now by proper adjustment of the resilient means 132 a sufficient downward force may be applied to the rollers 114 and 126 to move the hold-down plates 113 and 113' to flush position with the bottoms of their respective frusto-conical sections 107 and 107'.

Mounted on the beam 123 is a cam plate 133 having a cam surface 134 (FIGURE 17). Rigidly mounted on the frame member 35 is a stationary cam member 135 adjustably extending inwardly and alined for engagement with the cam surface 134. The cam member 135 is positioned so that when the carrier 37 is in the lowered position and moving with conveyor 20 it engages the cam surface 134 at the point when the carrier 37 begins to elevate (lug 46 approaching point A of FIGURE 6). The slope of the cam member 134 is selected so that the hold-down plates 113 and 113' remain in contact with the formed pie crust dough 110 until the rest of the head assemblies 91 and 92 have elevated sufficiently to dis-engage from the formed dough. Thus in effect the hold-down plates 113 and 113' hold the pie crust dough 110 to the pie plates 111 and 111' until the heads 91 and 92 have been elevated enough to dis-engage from the dough 110. By that time the cam surface 134 will have passed the cam member 135 and the hold-down plates 113 and 113' then return to their normal flush position. On the return movement (i.e. elevated and moving in a direction opposite to the conveyor 20) the cam plate 133 will pass along a path above the stationary cam member 135 and hence does not engage therewith. Means will now be described for rotating the gears 94 and 94' and circular plates 93 and 93'.

In FIGURES 3 and 5 an electric motor 136 is shown mounted on the carrier 37 with its output shaft in a vertical position. Since the motor 136 rides with the carrier 37 it is provided with electric energy through flexible conductors indicated at 137. The motor 136 is secured to the upward extending brackets 128 and 129 as shown best in FIGURE 5.

Referring now to FIGURE 4 the downward extending output shaft 138 on motor 136 is provided with a pinion 139. An upward extending shaft 140 is mounted on the motor support 127 having a large gear 141 journalled for rotation thereon and in meshed relation with the motor drive pinion 139. A small sprocket wheel 142 is also journalled for rotation on the shaft 140 and constrained for rotation with the large gear 141. Mounted on the base plate 85 are two upwardly extending shafts 143 and 144 spaced apart as shown in FIGURE 4. A pair of sprocket wheels 145 and 146 are journalled for rotation on shafts 143 and 144 respectively as shown and in alinement with the small sprocket wheel 142. A sprocket chain 147 driven by the sprocket wheel 142 drives the sprocket wheels 145 and 146. An adjustable idler sprocket wheel 148 is provided for maintaining the chain 147 taut.

The sprocket wheel 146 is provided with a downwardly extending hub 149 (FIGURE 3) having a drive pinion 150 constrained for rotation with the sprocket wheel 146. The drive pinion 150 is in meshed relation with the gear 94 on the forming head 91. The gear 94' of forming head 92 is driven by the sprocket 145 in a similar manner as that just described for gear 94 of forming head 91.

Referring again to FIGURE 5 it will be seen that mounted on the underside of base plate 85 between the forming heads 91 and 92 are a pair of positioning fixtures indicated generally at 151 and 152. These fixtures 151 and 152 are stationary and extend downward from a bracket 153 connected to the underside of the base plate 85. Both fixtures 151 and 152 are constructed identically and therefore only the fixture 151 will be described.

The fixture 151 comprises a positioning element 154 having a transverse groove 155 extending therethrough. The walls of the groove 155 on the upper portion thereof are in parallel spaced relation but at the lower portion taper in a longitudinal direction. Thus as the carrier 37 descends the groove 155 of the positioning element 154 engages the fingers 156 and 157 (FIGURE 14) of the pie plate holder positioning plates 158 and 159 which serves to move, if necessary, the pie plate holder, generally indicated at 160, in a longitudinal direction to make certain that the pie plate 111 (FIGURE 7) is in position for registration with the forming head 91 as it descends with the carrier 37.

The construction details of the carrier 37 including its drive means have now been described. Means will now be described for supporting the pie plate 111 (FIGURES 7, 10 and 11) on the conveyor 20.

Figure 14:
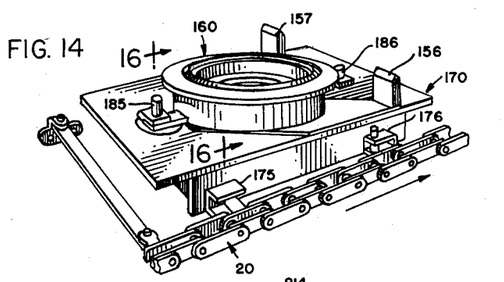
FIGURE 14 is a perspective view, partly broken away, illustrating in assembled form a saddle, mounted on a conveyor, supporting a pie plate holder of this invention.
Figure 15:
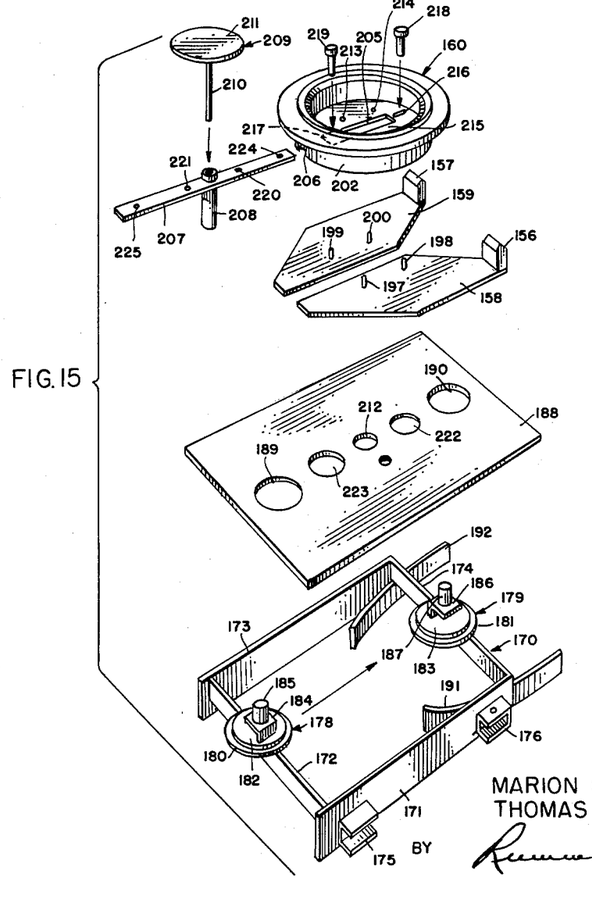
FIGURE 15 is a perspective view illustrating the components of the assembly of FIGURE 14 arranged in their respective order of assembly.
Figure 16:
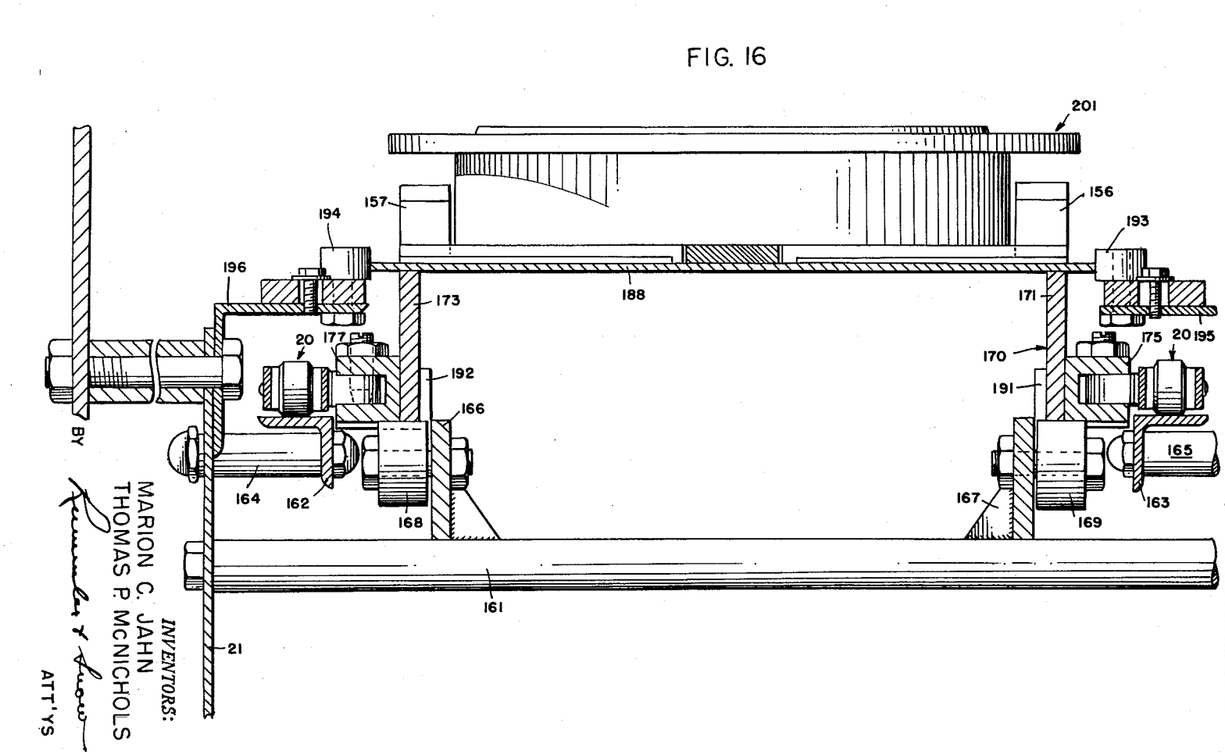
FIGURE 16 is a transverse view, in section and partly broken away, taken on line 16—16 of FIGURE 14 illustrating the construction details of a saddle mounted on a conveyor in support relation to a pie plate holder.

Reference is now made to FIGURES 14, 15 and 16. FIGURE 14 illustrates in perspective a complete assembly for supporting one pie plate 111 on the conveyor 20. FIGURE 15 illustrates the assembly of FIGURE 14 in its disassembled form. FIGURE 16 is a transverse sectional view of the assembly of FIGURE 14. In FIGURE 16 the rods one of which is shown at 161 are transverse ties between the sides of the stationary base 21 to assist in making it a rigid structure. The base 21 is provided with parallel conveyor tracks 162 and 163 secured rigidly to the base 21 as by studs 164 and 165. The purpose of the tracks 162 and 163 is to maintain the upper travel of the conveyor 20 horizontal, that is to say without any sagging. On the rods 161 are a series of brackets two of which are shown at 166 and 167 which support rollers 168 and 169.

A saddle, generally indicated at 170, is supported on the longitudinally spaced series of rollers 168 and series 169 as it moves with the conveyor 20. In FIGURE 15 the saddle 170 is seen to be a box-like structure comprising rigidly connected sides 171, 172, 173 and 174. Each of the sides 171 and 173 are provided with a pair of longitudinally spaced lugs two of which are shown at 175 and 176 in FIGURE 15 on side 171 and one at 177 shown on side 173 in FIGURE 16. The lugs are pinned to the conveyor chain 20 so that the saddle 170 moves positively with the conveyor 20.

The sides 172 and 174 of the saddle 170 (FIGURE 15) are provided with clamping fixtures indicated generally at 178 and 179. The fixtures 178, 179 comprise large disks 180 and 181 secured to the sides 172 and 174 respectively. Secured to the upper side of disks 180 and 181 are small disks 182 and 183. Secured to the upper side of small disk 182 is an angle bracket 184 having its open side to the right as viewed in FIGURE 15. The angle bracket 184 is provided with a conventional spring loaded detent 185 for a purpose described later herein. Similarly the fixture 179 is also provided with an angle bracket 186 with a detent 187 except that the angle bracket 186 has its open end in a leftward direction as viewed in FIGURE 15 for a purpose also to be described later herein. Guides 191 and 192 connected respectively to the sides 171 and 173 cooperate with stationary guides (not shown) in the base 21 to prevent transverse movement of the chains of conveyor 20.

A removable support plate 188 rests upon the fixtures 178 and 179 positioned by the small disks 182 and 183 which slidably fit into the holes 189 and 190 as best indicated in FIGURES 14 and 15. As shown in FIGURE 16 guide rollers 193 and 194 mounted on angle brackets 195 and 196, respectively, cooperate with the longitudinal sides of the support plate 188 for preventing transverse movement of the plate 188 while moving on the conveyor 20. The angle brackets 195 and 196 are suitably mounted on the base 21 as indicated in FIGURE 16.

As shown in FIGURE 15 a pair of symmetrical positioning plates 158 and 159 are disposed. The plate 158 is provided with two upwardly extending indexing pins 197 and 198 and likewise the plate 159 is also provided with two indexing pins 199 and 200.

In FIGURE 15 is illustrated a pie plate holder generally indicated at 160 which supports the pie plate 111 of FIGURE 7. With reference to FIGURE 7 it will be seen that the pie plate holder 160 comprises an annular shell 202 having an inwardly and outwardly extending flange portion 203. The inward portion of the flange 203 is adapted to cradle the pie plate 111 in support relation as shown. The upper surface of the flange 203 is provided with an upstanding annular ridge or bead 204 which cooperates with the underside of the dough cutting and serrating wheels 98, 99 and 100 in shearing relation with respect to the pie crust dough 110.

The bottom of the pie plate holder 160 is provided with a rectangular slot 205 positioned as best shown in FIGURE 14. A diametrical groove or recess 206 is cut in the bottom of pie plate holder 160 co-extensive with the rectangular slot 205 as best viewed in FIGURE 15. Removably fitted into the groove 206 is a bar 207. Centrally located on the bar 207 is rigid relation is a tubular element 208 which slidably accommodates the rod 210 of a knockout member 209. At this point it is mentioned that the lower end of the rod 210 of the knockout member 209 engages a cam (not shown) at the terminal end of the conveyor 20 which elevates the disk 211 for the purpose of engaging and moving the pie plate 111 upwardly so that it can easily be removed.

The lower portion of the tubular element 208 extends downwardly through the hole 212 of the support plate 188 and into the interior of the saddle 170 as shown in FIGURES 14 and 15.

The bottom of the pie plate holder 160 is also provided with indexing holes three of which are shown in FIGURE 15 at 213, 214 and 215. The indexing holes 213, 214 and 215 receive the indexing pins 199, 200 and 198, respectively, of the positioning plates 158 and 159 as evident from FIGURE 15. An additional indexing hole (not shown) in the holder 160 is provided to accommodate indexing pin 197 of positioning plate 158.

The bottom of the pie plate holder 160 is also provided with a pair of elongated holes 216 and 217 in alinement with groove 206 for accommodating bolts 218 and 219 in movable relation. The bar 207 has a pair of threaded bores 220 and 221 to accommodate, respectively, the bolts 218 and 219. The lower ends of the bolts 218 and 219 project downwardly into large clearance holes 222 and 223, respectively, in the support plate 188.

The outer end portions of the bar 207 are provided with small recesses 224 and 225 which cooperate, respectively, with detents 186 and 185 of the saddle 170.

The order of assembly of the foregoing is as follows. First the bar 207 is bolted into the groove 206 by bolts 218 and 219. The bolts 218 and 219 however do not fasten the bar 207 rigidly to the pie plate holder 160 but instead sufficiently loose so that the bar 207 may slide between the inner edges of positioning plates 158 and 159 within the limitation set by the elongated holes 216 and 217. Second, the knockout member 209 is inserted as indicated. Third, the support plate 188 is placed upon the saddle 170 so that disks 182 and 183 of the saddle 170 cooperate with the holes 189 and 190 of the plate 188. Fourth, the positioning plates 158 and 159 are placed on the support plate 188 in position whereby the indexing pins 197–200 may be received by the indexing holes of the pie plate holder 160. Lastly, the pie plate holder 160 with the bar 207 and knockout member 209 is placed upon the positioning plates 158 and 159 wherein the indexing pins 197–200 cooperate with the indexing holes of the holder 160, and then rotating the resulting movable assembly on the support plate 188 to move the ends of the bar 207 into the openings of the angle brackets 184 and 186 whereby the detents 185 and 186 of saddle 170 lockingly engage the detent recesses 225 and 224, respectively, of the bar 207. The resulting assembly is shown in FIGURE 14.

It will be seen that in the assembly of FIGURE 14 that the pie plate holder 160 and the positioning plates 158 and 159 secured thereto may be moved in a longitudinal direction (conveyor direction) a distance limited by the elongated holes 216 and 217 of the pie plate holder 160, all other components being rigidly secure with respect to the saddle 170 except for vertical movement of the knockout member 209.

In assembling the components above mentioned as illustrated in FIGURE 14, each alternate assembly is reversed with respect to the positioning plates 158 and 159. Thus, referring to FIGURE 12, it will be seen that the fingers 156 and 157 of the positioning plates 158 and 159 are adjacent with respect to the corresponding fingers of an adjacent assembly on the conveyor 20. The reason for this arrangement of the assemblies on the conveyor 20 is that, as previously explained, the carrier 37 of the machine 24 is provided with two forming, trimming and serrating heads 91 and 92 which cooperates simultaneously with two pie plate holders 160. Now as the carrier 37 descends the positioning element 154 (FIGURE 5) cooperates to receive the fingers 156 and 157 to move the positioning plates 158 and 159 with the pie plate holder 160 in a longitudinal direction thereby indexing the holder 160 precisely in position for receiving the forming head 91. Likewise the positioning element 154' engages the corresponding fingers of the adjacent assembly to index the position of its holder 160′ precisely to receive the head 92.

Now referring back to FIGURE 1 pie plates 111 are first inserted in the holders 160 on the conveyor 20 prior to the time they enter the dough depositor 22. The dough depositor 22 places a sheet of pie crust dough 110 with a slight excess thereof on each pie plate 111 in each respective holder 160. The pie plate holders 160 move continuously at constant speed on the conveyor 20. As an adjacent pair of holders 160 approach the pie crust trimming and serrating machine 24 of this invention the carrier 37 will be at the rightward or forward end of its forward travel and will be elevating as viewed in FIGURE 6. In other words the lug 46 will be moving between point A and point B on sprocket wheel 49. The elevating carrier 37 now permits the conveyor 20 to move a pair of pie plate holders 160 and 160′ (FIGURE 5) with untrimmed and unformed dough sheets 110 thereon into the mechanism 24. Meanwhile the carrier 37 is moving rearwardly as viewed in FIGURE 6 and will be elevated as previously explained. In other words the lug 46 moves from point B of sprocket 49 to point C of sprocket 48. After the lug 46 passes point C and approaches point D the cams 63 and 67 will have partly lowered the carrier 37 so that the positioning elements 154 and 154′ engage the fingers 156, 157, and corresponding fingers of their respective positioning plates (FIGURES 5 and 14). This initial engagement adjusts the longitudinal position of the pie plate holders 160 and 160′ for precise reception of the forming heads 91 and 92 respectively.

Now in FIGURE 6 when the lug 46 proceeds slightly past point D on sprocket 48 the cams 63 and 67 will complete the lowering of the carrier 37 whereby the forming heads 91 and 92 engage the pie crust dough 110 in pie plates 111 and 111′ respectively as they are carried by the pie plate holders 160 and 160′ respectively on the conveyor 20. The carrier 37 is then moving at the same speed as the conveyor 20 and therefore the forming heads 91 and 92 will remain in registration with the pie plates 111 and 111′ as the conveyor 20 proceeds forwardly.

Since the motor 136 on the carrier 37 is continuously energized the dough cutting and serrating wheels 98, 99 and 100 on each of the forming heads 91 and 92 will rotate continuously. The speed of rotation, as measured by the gears 94 and 94′, of from 1.5 to 3.5 revolutions during the period when the forming heads 91 and 92 are in engagement with the pie crust dough has been found to be satisfactory. Since the speed of the motor 136 is constant the number of revolutions of the gears 94 and 94′ will depend upon the speed chosen for the conveyor 20.

FIGURE 10 illustrates the dough sheet 110 on the pie plate 111 and pie plate holder 160 prior to engagement with forming head 91. When the carrier 37 is lowered into pie crust dough engagement the cutting and forming of the dough to a standing rim is effected as depicted in FIGURE 11. While the lug 46 (FIGURE 6) is moving toward point A on sprocket 49 the cutting and forming of the dough 100 by the forming heads 91 and 92 is taking place. Thus during this period the serrating wheel 100 (FIGURE 11) rotates about the peripheral portion of the pie plate 111 pushing inwardly the dough sheet margin overhanging the plate holder flange 203 and forming the dough into a standing rim 226 between the wheel 100 and the element 108 (FIGURE 9). The dough cutting wheels 98 and 99 engage the under side of the disk 109 and the top of the annular ridge 204 in shearing relation which serves to remove excess dough therefrom. The excess dough thus removed is carried by the conveyor 20 to its terminal end where it falls into a suitable receptacle.

When the lug 46 (FIGURE 6) approaches point A the trimming and forming operations by the heads 91 and 92 will have been completed. The cams 63 and 67 now begin to elevate the carrier 37 to disengage the forming heads 91 and 92 from the formed and trimmed pie crust dough 110 in the plates 111 and 111′. Simultaneously with the commencement of elevation of the carrier 37 by the cams 63 and 67, the tapered cam surface 134 (FIGURE 17) engages the stationary cam member 135 which now progressively rotates rock arms 124 and 125 as viewed in FIGURE 18. The rollers 114 and 126 at the respective ends of rock arms 124 and 125 now drive the rods 112 and 112′ and associated hold-down plates 113 and 113′ downward relative to the carrier 37. The taper of the cam surface 134 (FIGURE 17) is of such magnitude that in relation to the pie crust dough 110 there is no vertical movement. In other words as the carrier 37 begins to rise the position of the hold-down plates 113 and 113′ remains relatively unchanged with respect to the formed pie crust dough 110. The effect is to hold the dough 110 in the pie plates 111 and 111′ while the remainder of the forming heads 91 and 92 separates from the dough.

When the lug 46 (FIGURE 6) reaches point A on sprocket 49 the cam surface 134 (FIGURE 17) will have passed the cam member 135 and thus the hold-down plates 113 and 113′ will retract from the dough 110. The conveyor 20 continues forwardly and carries the pie plate holders 160, 160′ and pie plates 111 and 111′ with dough 110 where they emerge from the machine 24 and they move toward the pie filling unit 23. Meanwhile the cycle thus described repeats itself for performing the pie crust dough trimming and forming on the next pair of pie plate holders moving on the conveyor 20.

From the above it is seen that the described pie crust dough forming, trimming and serrating mechanism 24 performs its function simultaneously on two separate pie plates with dough sheets thereon. Obviously if desired the mechanism 24 may be provided with only one forming head or a plurality greater than two.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A pie crust dough forming mechanism comprising a frame supporting a carrier, said carrier having at least one vertically disposed dough forming head with rotatable dough forming means thereon, a horizontal conveyor on said frame and means for driving said conveyor at a constant speed, a source of power mounted on said carrier in drive relation with said forming means, a first drive means mounted on said frame adapted to reciprocate said carrier in a horizontal direction parallel with said conveyor and at the speed thereof, a second drive means mounted on said frame adapted to reciprocate said carrier in a vertical direction in cycle relation with said first drive means whereby said carrier moves vertically while moving linearly in said horizontal direction at the speed of said conveyor, said second drive means comprising at least one rotatable cam mounted on said frame and positioned in engaging relation with said carrier and governed by said first drive means, and means on said conveyor for supporting said dough in register relation with said forming head while said carrier is moving linearly in said horizontal direction.

2. A dough forming mechanism as defined in claim 1, wherein the first drive means comprises a pair of sprockets mounted on said frame and spaced apart longitudinally of said conveyor, a continuous chain encircling said sprockets in drive relation therewith, and a lug on said chain having driving connection with said carrier.

3. A pie crust dough forming and trimming mechanism comprising a frame supporting a movable carrier, said carrier having at least one vertically disposed dough forming head with rotatable dough forming and cutting wheels thereon, a source of power in drive relation with said wheels, a first drive means mounted on said frame adapted to reciprocate said carrier in cycle relation in a horizontal direction, a second drive means mounted on said frame adapted to reciprocate said carrier in a vertical direction in cycle relation with said first drive means whereby said carrier moves vertically while moving linearly in said horizontal direction for at least a portion of said horizontal movement cycle, at least one positioning element mounted on said carrier, a conveyor moving in said horizontal direction parallel with the movement of said carrier and having a plurality of pie plate holders mounted thereon, positioning means on said conveyor for adjustably moving said pie plate holders longitudinally with respect to said conveyor, said conveyor moving at a speed equal to the speed of said carrier when said carrier is moving linearly in said horizontal direction, said positioning element of said carrier cooperatively engaging said positioning means on said conveyor to adjust the position of said pie plate holder for registering a pie plate thereon in engaging relation with said forming head while said carrier is moving linearly in said longitudinal horizontal direction.

4. A pie crust dough forming and trimming mechanism for making standing rim pie crusts comprising a frame supporting a movable carrier, said carrier having at least one vertically disposed dough forming head with rotatable dough forming and cutting wheels thereon, a standing rim dough forming member disposed on said forming head, at least one of said wheels being adapted to cooperate with said rim forming member for forming said dough into a standing rim of the kind described, a source of power in drive relation with said wheels, a first drive means mounted on said frame adapted to reciprocate in cycle relation said carrier in a longitudinal horizontal direction, a second drive means mounted on said frame adapted to reciprocate said carrier in a vertical direction in cycle relation with said first drive means wherein said carrier moves linearly in said longitudinal horizontal direction for at least a portion of said cycle, at least one positioning element mounted on said carrier, a conveyor moving in said longitudinal horizontal direction having a plurality of pie plate holders mounted thereon, positioning means on said conveyor for adjustably moving said pie plate holders with respect to said conveyor, said conveyor moving at a speed equal to the speed of said carrier when said carrier is moving linearly in said longitudinal direction, said positioning element of said carrier cooperatively engaging said positioning means on said conveyor to adjust the position of said pie plate holder for registering a pie plate thereon in engaging relation with said forming head when said carrier is moving in said longitudinal horizontal direction.

5. A pie crust dough forming and trimming mechanism for making standing rim pie crusts comprising a frame supporting a movable carrier, said carrier having at least one vertically disposed dough forming head with rotatable dough forming and cutting wheels thereon, a standing rim dough forming member disposed on said forming head, at least one of said wheels being adapted to cooperate with said rim forming member for forming said dough into a standing rim of the kind described, a source of power in drive relation with said wheels, a positive first drive means mounted on said frame adapted to reciprocate said carrier in cycle relation in a longitudinal horizontal direction, said first drive means having a pair of horizontally spaced rotatable sprockets and a sprocket chain operatively connected thereto, said chain having a projecting lug secured to one link thereof, a groove positioned on said carrier in cooperative engagement with said lug in drive relation for reciprocating said carrier longitudinally in unison with longitudinal movement of said lug, a second positive drive means mounted on said frame for reciprocating said carrier in a vertical direction in cycle relation with said first drive means whereby said carrier moves vertically while moving in said longitudinal horizontal direction for at least a portion of said horizontal movement cycle, at least one positioning element mounted on said carrier, a conveyor moving in said longitudinal horizontal direction having a plurality of pie plate holders mounted thereon, and positioning means on said conveyor for adjustably moving said pie plate holders longitudinally with respect to said conveyor, said conveyor moving at a speed equal to the speed of said carrier when said carrier is moving linearly in said longitudinal horizontal direction, and said positioning element of said carrier cooperatively engaging said positioning means on said conveyor to adjust the position of said pie plate holder for registering a pie plate thereon in engaging relation with said forming head while said carrier is moving in said longitudinal horizontal direction.

6. A pie crust dough forming and trimming mechanism for making standing rim pie crusts comprising a frame supporting a movable carrier, said carrier having at least one vertically disposed dough forming head with rotatable dough forming and cutting wheels thereon, a standing rim dough forming member disposed on said dough forming head, at least one of said wheels being adapted to cooperate with said rim forming member for forming said dough into a standing rim of the kind described, a source of power in drive relation with said wheels, a positive first drive means mounted on said frame adapted to reciprocate said carrier in cycle relation in a longitudinal horizontal direction, said first drive means having a pair of horizontally spaced rotatable sprockets and a sprocket chain operatively connected thereto, said chain having a projecting lug secured to one link thereof, a groove positioned on said carrier in cooperative engagement with said lug in drive relation for reciprocating said carrier longitudinally in unison with longitudinal movement of said lug, a second positive drive means mounted on said frame adapted to reciprocate said carrier in a vertical direction in cycle relation with said first drive means whereby said carrier moves vertically while moving in said longitudinal horizontal direction for at least a portion of said horizontal movement cycle, said second drive means having at least one cam positioned in operative relation with said carrier for reciprocating said carrier in a vertical direction, at least one positioning element mounted on said carrier, a conveyor moving in said longitudinal horizontal direction and having a plurality of pie plate holders mounted thereon, and positioning means on said conveyor for adjustably moving said pie plate holders longitudinally with respect to said conveyor, said conveyor moving at a speed equal to the speed of said carrier when said carrier is moving linearly in said longitudinal horizontal direction, and said positioning element of said carrier cooperatively engaging said positioning means on said conveyor to adjust the position of said pie plate holder for registering a pie plate thereon in engaging relation with said forming head when said carrier is moving in said longitudinal horizontal direction.

7. A pie crust dough forming and trimming mechanism for making standing serrated rim pie crusts comprising a frame supporting a movable carrier, said carrier having a pair of longitudinally spaced vertically disposed forming heads, each of said heads having a standing rim dough serrating member mounted thereon, a plurality of rotatable dough forming and cutting wheels disposed on each of said heads, at least one of said wheels on each head being adapted to cooperate with said serrating member of said head for forming said dough into a standing serrated rim, a source of power in drive relation with said wheels, a positive first drive means mounted on said frame adapted to reciprocate said carrier in cycle relation in a longitudinal horizontal direction, said first drive means having a pair of longitudinally spaced rotatable sprockets and a sprocket chain operatively connected thereto, said chain having a projected lug secured to one link thereof, a groove positioned on said carrier in cooperative engagement with said lug in drive relation for reciprocating said carrier longitudinally in unison with longitudinal movement of said lug, a second positive drive means mounted on said frame adapted to reciprocate said carrier in a vertical direction in cycle relation with said first drive means whereby said carrier moves vertically while moving linearly in said longitudinal horizontal direction for at least a portion of said horizontal movement cycle, said second drive means having a plurality of cams positioned in coordinated operative relation with said carrier for reciprocating said carrier in a vertical direction, a pair of positioning elements mounted on said carrier, a conveyor moving in said longitudinal horizontal direction parallel with the horizontal movement of said carrier and having a plurality of removable longitudinally spaced pie plate holders mounted thereon, positioning means on said conveyor for adjustably moving each of said pie plate holders in a longitudinal direction with respect to said conveyor, said conveyor moving at a speed equal to the speed of said carrier when said carrier is moving linearly in said longitudinal horizontal direction, each of said positioning elements of said carrier cooperatively engaging the positioning means on an adjacent pair of said holders for registering in engaging relation one of said holders with one of said forming heads and the other of said holders with the other of said forming heads simultaneously while said carrier is moving in said longitudinal horizontal direction.

8. In a dough forming machine comprising a horizontally disposed continuously moving conveyor, a frame for supporting said conveyor, a carrier mounted on said frame for vertical and longitudinal movement with respect to said conveyor, a forming head on said carrier, and means for driving said carrier reciprocatively both longitudinally and vertically in cycle relation with the movement of said conveyor; a plurality of longitudinally spaced plate holders adjustably mounted on said conveyor, means on each of said plate holders for shifting the respective plate holder longitudinally with respect to said conveyor, and indexing means on said carrier for engaging the last named means successively and shifting the respective plate holder into vertical registry with said forming head.

9. The combination defined by claim 8 wherein the indexing means on the carrier is disposed to engage a plate holder shifting means upon vertically downward movement of the carrier and disengage from the said shifting means upon upward movement of the carrier.

References Cited in the file of this patent

UNITED STATES PATENTS

| | | |
|---|---|---|
| 260,369 | Camp | July 4, 1882 |
| 1,575,214 | Kohler | Mar. 2, 1926 |
| 2,624,296 | Nuttall | Jan. 6, 1953 |
| 2,663,478 | Jahn et al. | Dec. 22, 1953 |
| 2,906,392 | Galloway | Sept. 29, 1959 |